M. A. AND L. P. JACKSON.
PIE BAKER.
APPLICATION FILED DEC. 16, 1918.
1,316,365.
Patented Sept. 16, 1919.
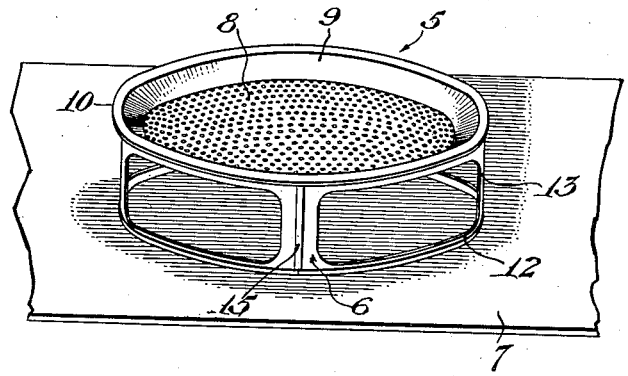
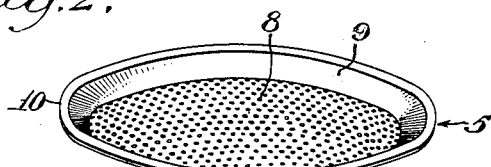
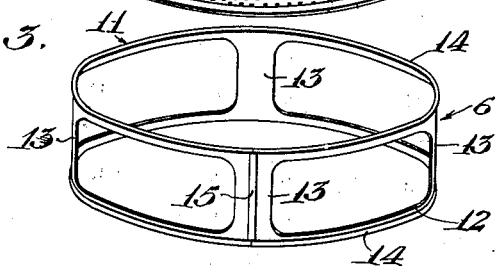
Inventors
Mary A. Jackson
Lulu P. Jackson
by Graham & Harris
Attorneys

UNITED STATES PATENT OFFICE.

MARY A. JACKSON AND LULU P. JACKSON, OF LOS ANGELES, CALIFORNIA.

PIE-BAKER.

1,316,365.                Specification of Letters Patent.    Patented Sept. 16, 1919.

Application filed December 16, 1918. Serial No. 267,042.

*To all whom it may concern:*

Be it known that we, MARY A. JACKSON and LULU P. JACKSON, both citizens of the United States, residing at Los Angeles, in the county of Los Angeles and State of California, have invented a new and useful Pie-Baker, of which the following is a specification.

Our invention relates to the art of baking, being more particularly a device for baking pies. Ordinarily in baking pies a shallow imperforate pie pan is used but such a pan is unsatisfactory as the under crust or bottom of the pie does not brown like the top crust due to the moisture in the filling of the pie soaking into the bottom crust, consequently the bottom crust is more or less soggy and indigestible as well as unpalatable. We are aware that pie pans have been made with perforated bottoms and while this type of pie pan helps to overcome these objections to some degree, at the same time the use of such perforated pans have the objection that if they are set upon the flat bottom of the oven or upon shelves wherever the pan touches the shelf or bottom the pie burns due to the direct contact of the pie pan with the hot support.

We have discovered that by using a perforated pie pan and raising the pie pan above the support, that is the bottom of the oven or shelf as the case may be, and allowing the heat to pass freely under the bottom of the pie pan, that the pie is baked evenly throughout, the upper and bottom crust browning evenly thereby producing a baked product of much superior qualities than the common pie as ordinarily baked.

Pies so baked do not have a soggy bottom due to the fact that the heat of the oven has free access to the bottom of the pan.

The principal object of our invention is to produce a pie baker, having the advantages above pointed out, of simple form and construction.

Referring to the drawings which are for illustrative purposes only,

Figure 1 is a perspective view of a pie baker embodying our invention, the baker being shown resting upon the bottom plate such as found in the ordinary oven.

Fig. 2 is a perspective view of the pie pan, and

Fig. 3 is a perspective view of the holder.

5 designates a pie pan, 6 the holder and 7 a portion of the bottom of an oven. The pan 5 has a perforated bottom 8 and upwardly flaring side walls 9 terminating in a circular rim 10. The holder 6 consists of a circular sheet metal member having a band 11 at the top and a band 12 at the bottom connected by legs 13, the bands 11 and 12 being finished by wire rolled edges 14, a common sheet metal construction. The bands and legs may be made from a single strip of sheet metal and the ends joined in any well known manner as indicated at 15. The diameter of the holder is of proper size so that the upper edge of the holder fits under the rim 10 of the pan and supports the pan in elevated position as shown in Fig. 1 so that the heat of the oven may have ready access to the bottom of the pan at the same time raising the pan off of the floor of the oven.

What we claim is;

1. A pie baker comprising a pie pan having a perforated bottom, a rim formed on the pan, and a holder arranged to engage the pan under the rim to support the pan, said holder consisting of a vertically extending circular member having openings therein.

2. A pie baker comprising a pie pan having a perforated bottom, a rim formed on the pan, and a holder arranged to engage the pan under the rim to support the pan, said holder consisting of upper and lower vertically arranged circular bands and legs connecting said bands permitting a free circulation of heat under the pan.

In testimony whereof, we have hereunto set our hands at Los Angeles, California, this 9th day of December, 1918.

MARY A. JACKSON.
LULU P. JACKSON.